US010983511B2

(12) United States Patent
Da Silva et al.

(10) Patent No.: US 10,983,511 B2
(45) Date of Patent: Apr. 20, 2021

(54) AUTOMATION CONTROL SYSTEM

(71) Applicant: Quest Automated Services, LLC, Tulsa, OK (US)

(72) Inventors: Hanz Da Silva, Fort Worth, TX (US); Edward Martell, Arling, TX (US)

(73) Assignee: Quest Automated Services, LLC, Tulsa, OK (US)

( * ) Notice: Subject to any disclaimer, the term of this patent is extended or adjusted under 35 U.S.C. 154(b) by 139 days.

(21) Appl. No.: 15/879,683

(22) Filed: Jan. 25, 2018

(65) Prior Publication Data

US 2018/0231963 A1  Aug. 16, 2018

Related U.S. Application Data

(60) Provisional application No. 62/458,852, filed on Feb. 14, 2017.

(51) Int. Cl.
| | |
|---|---|
| *G05B 19/418* | (2006.01) |
| *G06F 3/048* | (2013.01) |
| *H04L 12/28* | (2006.01) |
| *H04W 4/70* | (2018.01) |
| *G05B 19/042* | (2006.01) |
| *H04W 4/38* | (2018.01) |
| *H04W 4/06* | (2009.01) |

(52) U.S. Cl.
CPC ..... *G05B 19/41885* (2013.01); *G05B 19/042* (2013.01); *G05B 19/0426* (2013.01); *G06F 3/048* (2013.01); *H04L 12/2816* (2013.01); *H04W 4/70* (2018.02); *G05B 2219/23275* (2013.01); *G05B 2219/23293* (2013.01); *H04W 4/06* (2013.01); *H04W 4/38* (2018.02); *Y02P 90/02* (2015.11)

(58) Field of Classification Search
CPC .............. G05B 19/41885; G06F 3/048; H04L 12/2816; H04W 4/70; H04W 4/38; H04W 4/06; Y02P 90/02
See application file for complete search history.

(56) References Cited

U.S. PATENT DOCUMENTS

| | | | |
|---|---|---|---|
| 6,668,354 | B1 | 12/2003 | Chen et al. |
| 7,313,564 | B2 | 12/2007 | Melamed et al. |
| 7,706,895 | B2 | 4/2010 | Callaghan |
| 8,244,774 | B2 | 8/2012 | Betts et al. |
| 8,402,434 | B2 | 3/2013 | McLean |
| 8,751,629 | B2 | 6/2014 | White et al. |
| 9,348,564 | B2 | 5/2016 | Keller |
| 2005/0188351 | A1 | 8/2005 | Hoefler et al. |

(Continued)

*Primary Examiner* — Ziaul Karim
(74) *Attorney, Agent, or Firm* — Hall Estill Attorneys at Law; Tyler Mantooth

(57) ABSTRACT

A system can provide automation with at least a computing device receiving an automation model via a graphical user interface that is converted to computer code with a controller of the computing device. A parser module of the computing device can remove portions of the computer code to create broadcast parameters that are subsequently transmitted to an automation device. A de-parser module of the automation device may translate the broadcast parameters into an automation process that is executed with the automation device to physically enact the automation model with the automation device.

20 Claims, 3 Drawing Sheets

(56) References Cited

U.S. PATENT DOCUMENTS

| | | | |
|---|---|---|---|
| 2009/0210814 A1* | 8/2009 | Agrusa | G05B 23/0267 |
| | | | 715/772 |
| 2011/0022192 A1* | 1/2011 | Plache | G05B 19/4188 |
| | | | 700/28 |
| 2011/0093800 A1 | 4/2011 | Gottwald et al. | |
| 2012/0158165 A1* | 6/2012 | Bohm | G06Q 10/06 |
| | | | 700/97 |
| 2013/0231787 A1* | 9/2013 | Chapman | E21B 44/00 |
| | | | 700/282 |
| 2016/0055140 A1* | 2/2016 | McKenzie | G06F 17/246 |
| | | | 715/212 |

\* cited by examiner

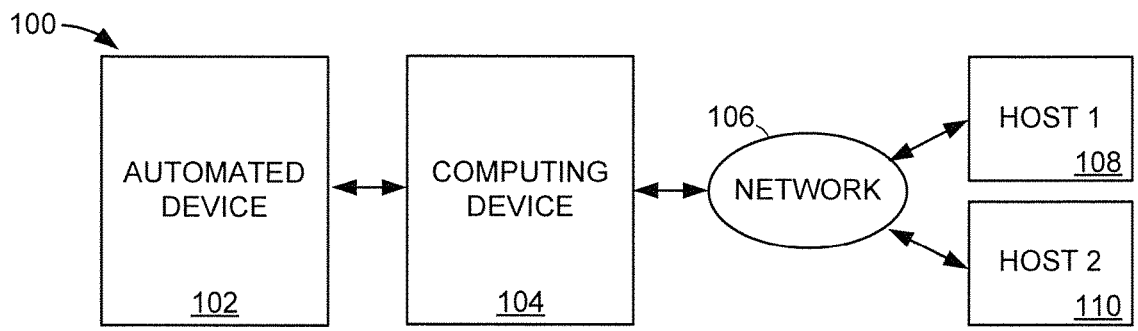
FIG. 1
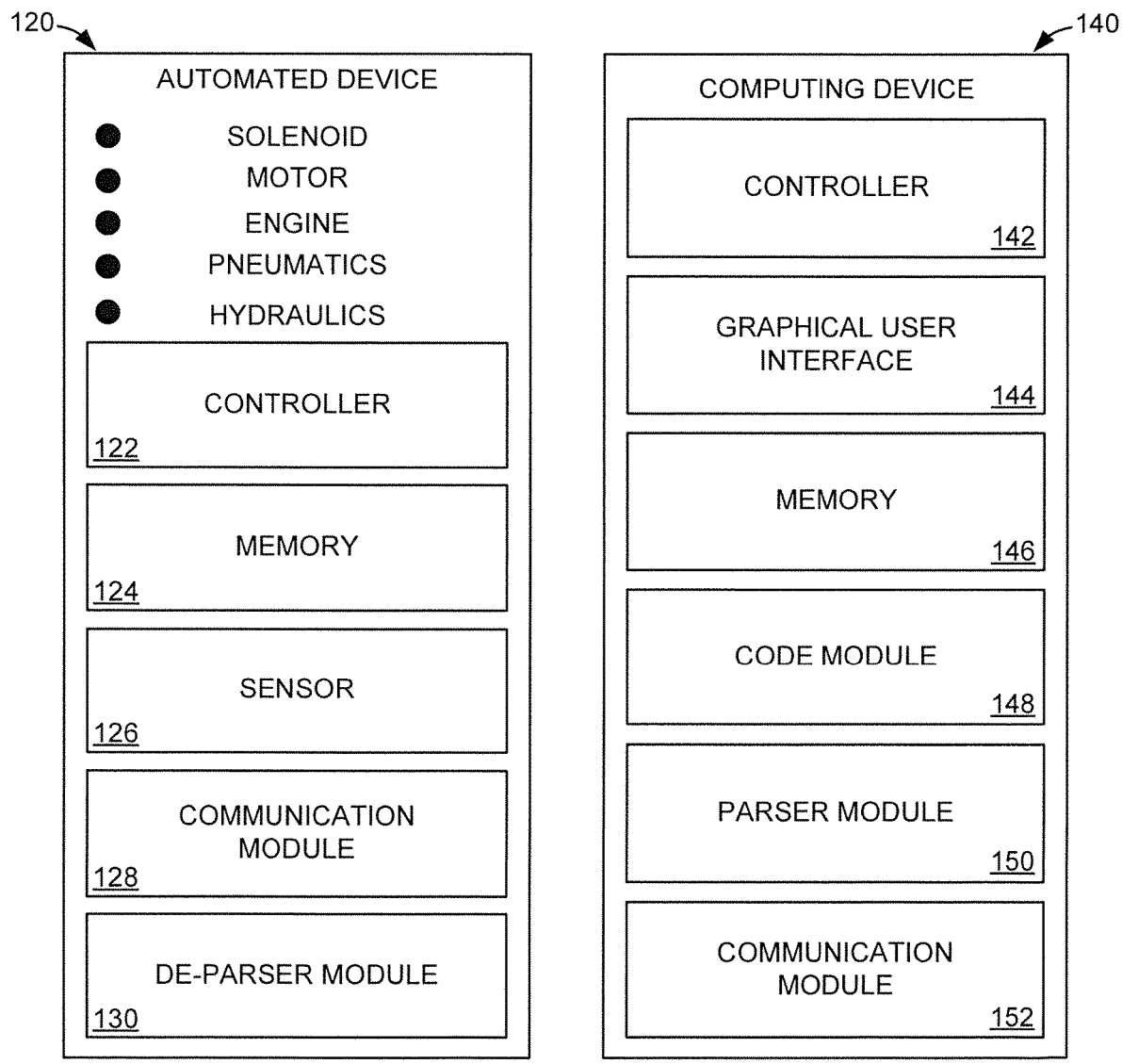
FIG. 2
FIG. 3

AUTOMATION CONTROL SYSTEM

RELATED APPLICATION

The present application makes a claim of domestic priority to U.S. Provisional Patent Application No. 62/458,852 filed Feb. 14, 2017, the contents of which are hereby incorporated by reference.

SUMMARY

A system can provide automation, in accordance with assorted embodiments, by inputting an automation model into a computing device via a graphical user interface of the computing device. A controller of the computing device converts the automation model to computer code that is reduced by a parser module of the computing device to create broadcast parameters. The broadcast parameters are transmitted to an automation device where they are translated into an automation process with a de-parser module of the automation device. The automation process is then executed with the automation device to physically enact the automation model with the automation device.

BRIEF DESCRIPTION OF THE DRAWINGS

FIG. 1 displays a block representation of an example automation system in which various embodiments may be practiced.

FIG. 2 is a representation of an example automated device capable of being utilized in the automation system of FIG. 1

FIG. 3 conveys an example computing device that may be employed in the automation system of FIG. 1 in accordance with assorted embodiments.

DETAILED DESCRIPTION

Figure 4:
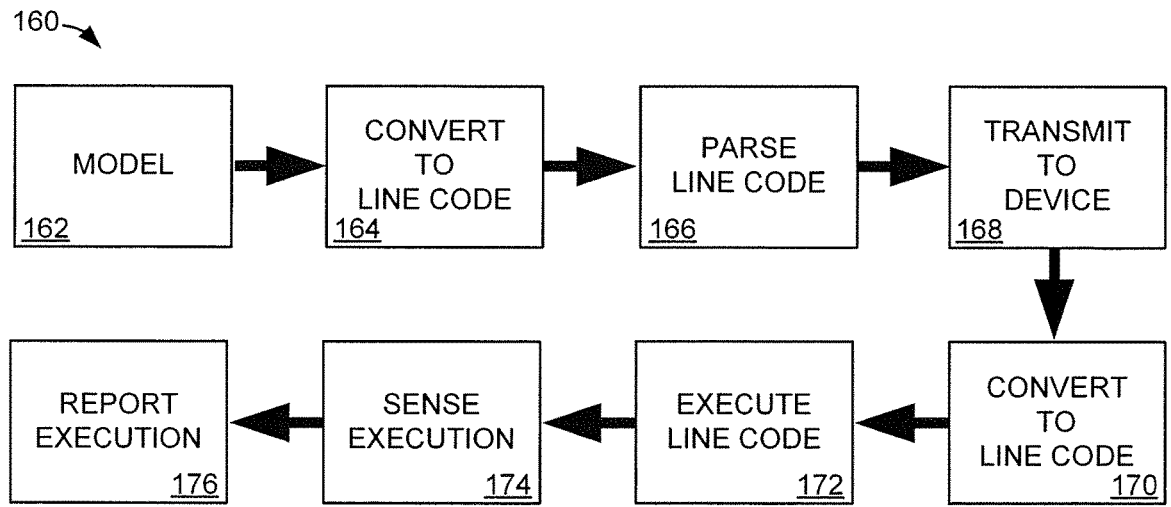
FIG. 4 shows an example timeline for operation of an example automation system in accordance with various embodiments.

With the advancement and miniaturization of computing devices, increasing numbers of activities and processes can be partially, or completely, automated. Such automation can increase efficiency and safety with relatively simple actions. While technologically advanced computing and automation components can handle more complex processes, automation control has been hampered by transmission protocol that limit the automation code and parameters that can be broadcast to an automated device, which results in long and unnecessarily complex development and testing of automation systems.

Accordingly, various embodiments of the present disclosure involve methods and associated apparatus that efficiently correlate computer models into executed automation actions. By parsing computer code generated by a computing device during modeling, automation controls can be quickly and easily transmitted and executed by an automation device. The ability to utilize the processing power of the computing device to model various automation aspects, generate computer code that represents the modeled automation, parse the computer code into parameters that can be easily understood and executed by a connected automation device, and transmit the parameters to the automation device allows the automation device to utilize minimal onboard processing power to execute the parsed automation parameters as a physical representation of the modeled automation.

FIG. 1 displays a block representation of an example automation system 100 that can operate in accordance with assorted embodiments to optimize the development and testing of automation control. The automation system 100 can utilize any number of automated devices 102 independently or concurrently to carry out a diverse variety of tasks, such as manufacturing, construction, down-hole exploration, and testing. It is contemplated that the system 100 may have multiple different automated devices 102 that may be physically separated, or interconnected, to carry out one or more tasks. An automated device 102 may be any assembly of parts capable of translating computer readable code into motion without direct physical or logical manipulation by a user. Hence, the automated device 102 is configured to operate autonomously as directed by pre-programmed instructions without involvement by a user.

Regardless of the number, type, and location of the automated device(s) 102 of the automation system 100, each automated device 102 can be connected to a computing device 104 via a wired or wireless connection. The computing device 104 can be stationary, such as a desktop computer, or mobile, such as a laptop, tablet computer, or smartphone. The computing device 104 can conduct a variety of different computing activities, such as data generation, manipulation, storage, and transmission, via one or more local processing components. Although not limiting, the computing device 104 can receive physical input from a user, process the input into computer readable code, such as machine code, and transmit that code to the automated device(s) 102.

In some embodiments, the computing device 104 can utilize a wired or wireless network 106 connection to engage one or more remote hosts 108 and 110. The remote hosts 108 and 110 can provide additional processing, data storage, and connectivity that can concurrently or independently complement the capabilities of the computing device 104 to make control of the automated device(s) 102 more efficient. For instance, the first host 108 may be a remote server that provides additional data storage capacity while the second host 110 is a network node that can utilize additional computing capabilities from one or more devices physically separated from the computing device 104.

FIG. 2 conveys an example automated device 120 that can be constructed and operated as part of the automation system 100 of FIG. 1 in accordance with some embodiments. An automated device 120 may have one or more means for motion that can concurrently, or independently, induce activity in at least one component of the device 120. For instance, a motor and solenoid may concurrently articulate an arm while an engine supplies hydraulic and/or pneumatic pressure to be used by the arm at a later time. It is noted that the automated device 120 can have any number of components that move, spin, and grasp as orchestrated by a predetermined choreographed automation process and carried out by the means for motion that can be physically located on, or separated from, the automated device 120 itself.

The automated device 120 is adapted to provide computing capabilities with at least one local controller 122, such as a microprocessor or application specific integrated circuit (ASIC), that is physically located on/in the automated device 120. The controller 122 can direct data into, and out of, a local memory 124, which may be a volatile or non-volatile memory, such as a hard disk drive, solid-state memory array, or hybrid data storage device. The temporary, or permanent, storage of data in the local memory 124 allows the automated device 120 to conduct various operations without being connected to a control device, such as the computing device 104 of FIG. 1.

The automated device 120 can employ one or more sensors 126 that can continuously, routinely, or sporadically activate to monitor operational and environmental conditions in and around various portions of the automated device 120. As a non-limiting example, a temperature sensor can operate continuously while a proximity sensor is sporadically activated when a portion of the automated device 120 is within a predetermined physical tolerance with an object. Regardless of the number and type of sensors utilized by the automated device 120, data can be locally stored in the memory 124 and processed by the controller 122, which allows increased autonomy compared to devices that do not have local computing capabilities.

Although the automated device 120 can generate, store, and process data locally, various embodiments connect the device 120 with at least one remote host, such as the computing device 104 or hosts 108/110 of FIG. 1, via a communication module 128. The communication module 128 can utilize one or more different types of communication means to transfer data, such as cellular, wireless local network, and wired connection protocol. It is contemplated that the automated device 120 employs redundant communication means via the communication module 128 to ensure the device 120 is in constant communication with a remote host.

The automated device 120 may employ a de-parser module 130 to convert parsed automation information into automation code that corresponds with the automation process desired by a user. The de-parser module 130 can utilize the controller 122 and non-volatile memory 124 to store and process received broadcast parameters into automation code that results in an automation process being executed by the device 120. The ability to de-parse transmitted communications locally in the automated device 120, instead of at the computing device 102 where an automation process was created, allows the broadcast parameters to be logically smaller and more efficiently transmitted compared to if the entire automation process computer code was transmitted.

FIG. 3 shows a block representation of an example computing device 140 that can be incorporated in the automation system 100 in accordance with assorted embodiments. The computing device 140 can be used continuously, but in some embodiments is utilized during design, testing, and implementation of an automation process that is stored locally in one or more automated devices. The computing device 140 has at least one local controller 142 that directs data processing entered by a user via a graphical user interface (GUI) 144. A user is to be understood as a human operator that engages the GUI 144 to generate, or manipulate, data that is temporarily and permanently stored locally in a memory 146.

Various embodiments have software stored in the local memory 146 that can be utilized to model and program an automation process as directed by the user. The local controller 142 may provide a graphical representation of an automation process via the GUI 144. In a non-limiting embodiment, the computing device 140 allows a user to visually model an automation process without manually inserting lines of computer or machine code. That is, the computing power and capabilities of the computing device 140 can allow existing, or future, movement, actions, and processes of one or more automated devices 120 to be visually generated and manipulated without the user actually typing lines of code.

Such visual modeling capability can be highly efficient as the computing power of the computing device 140 converts visual models from the GUI 144 into lines of computer/machine code via a code module 148. The code module 148 may operate as part of a database of code that has been predetermined. However, the code module 148 may also generate new code that is inserted into the database, or updates existing code stored in the database.

While the various lines of computer/machine code may be distributed to an automated device 120 for execution, long and/or complex automation processes can be very time consuming and rely on an uninterrupted communication pathway between the computing 140 and automated 120 devices. Hence, a parser module 150 of the computing device 140 can condense or translate portions of code into parameters that are essential for transmission to an automated device 120. In the past, parsing of an automation process was limited to parameters that conform to communication protocol dictated by a third party. As a result, the full range of capabilities of an automated device 120 may not be able to be utilized. Hence, development of open source communication protocol, such as open platform communications-unified architecture (OPC-UA), has allowed machine code to be transmitted between computing 140 and automated 120 devices via a communication module 152 as dictated by the computing device 140.

The use of open source communication protocol to transmit machine code and/or automation process parameters allows a diverse variety of automation control to be sent to an automated device 120. However, the increased control provided by the open source communication protocol has corresponded with larger development and testing schedules that are expensive in terms of time and resources. Accordingly, various embodiments configure the parser module 150 to efficiently transition between a visual model present on the GUI 144 to condense machine code from a local database that forms an automation process into broadcast parameters that can efficiently be transmitted to, processed by, and executed by the automated device 120.

FIG. 4 depicts a logical flow for an example automation system 160 that utilizes the computing device 140 of FIG. 3 to optimize the transition from modeled and coded automation process to executed device activity. Initially, an automation process begins with a model in step 162, which may be created or manipulated completely by a human user on a computing device 140. The computing device 140 automatically converts the modeled automation process into a plurality of computer code (line code) as part of a database in step 164. The computer code is then parsed in step 166 by a parser module into broadcast parameters that are logically smaller than the entire coded automation process and are more quickly transmitted to one or more automated devices in step 168.

In other words, the broadcast parameters replace the entirety of the computer coded automation process with a more lightweight package that can be transmitted to the automation device(s) more efficiently. The broadcast parameters also are more efficiently processed back into the computer code by a de-parser module of the automated device 120 in step 170 compared to if the entirety of the code was transmitted or if a non-open source communication protocol limited the broadcast parameters.

With the automated device 120 having the entirety of the automation process from step 170, the process is executed in step 172 as part of a choreographed routine. The execution may be sensed in step 174 by one or more sensors in and around the automated device to verify the accurate and complete performance of the automation process. The sensed conditions are subsequently reported in 176 to a remote host, such as the computing device 140. The ability to efficiently go from a model resident on a computing device to executed process by an automated device allows increasingly long and complex automation processes to be tested, refined, and implemented, which can translate into greater performance and throughput for industries that utilize automation.

Figure 5:
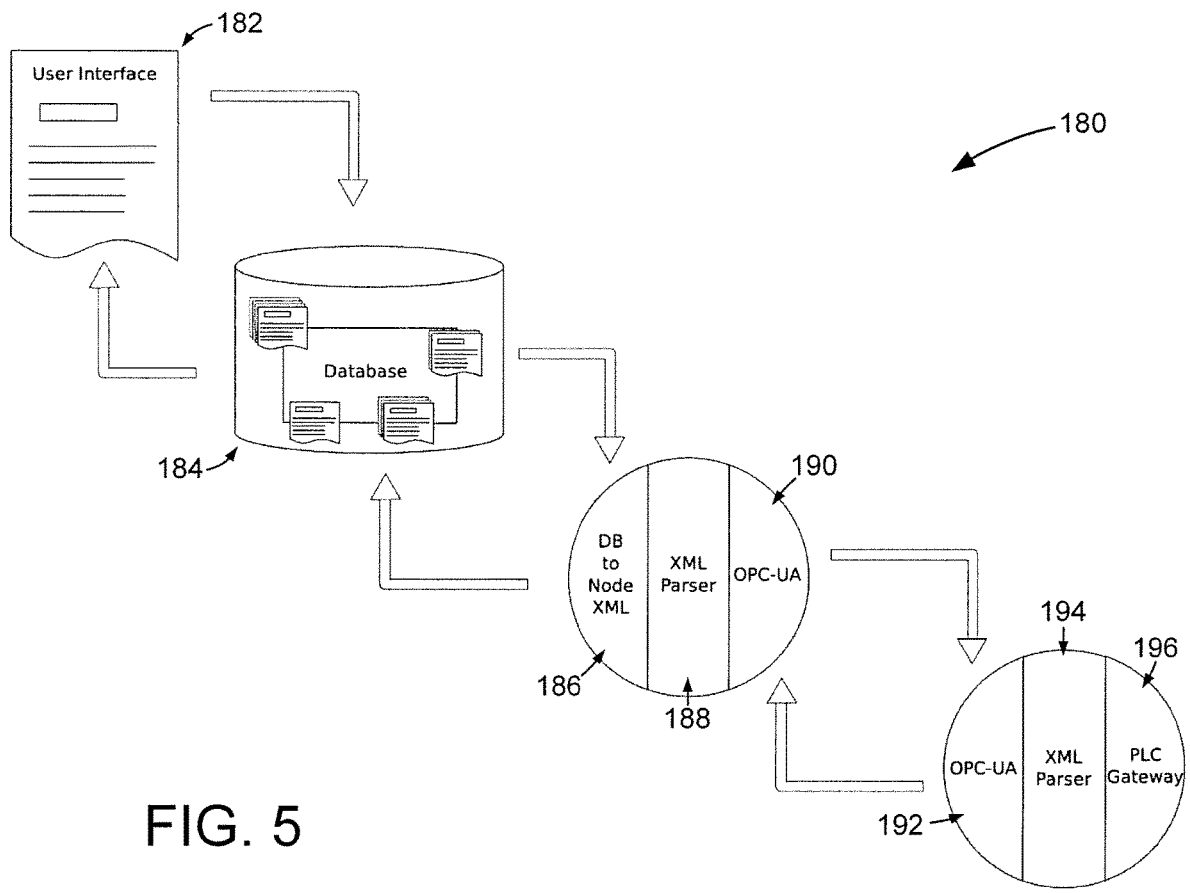
FIG. 5 illustrates an example automation system operated in accordance with some embodiments.

FIG. 5 is an example automation system 180 that can utilize the various aspects of FIGS. 1-4 to provide optimized device automation in accordance with some embodiments. A user interface 182 is employed by a user to create a complete automation process that is then converted to a database 184 of code, which may be multiple lines of computer and/or machine code. A code module 186 translates the database code into a readable format, such as XML code.

A parser module 188 proceeds to compile the XML code into a group of broadcast parameters that are transmitted to an automated device via a communication module 190 as an open source protocol (OPC-UA). A communication module 192 of the automated device receives the broadcast parameters as part of the open source protocol and then de-parses the broadcast parameters into XML code. It is noted that the XML code from the de-parser module of the automated device matches the XML code from the code module 186 and fully represents the automation process modeled in the user interface 182. Next, the XML code is executed via an electronic gateway, such as a PLC gateway.

Figure 6:
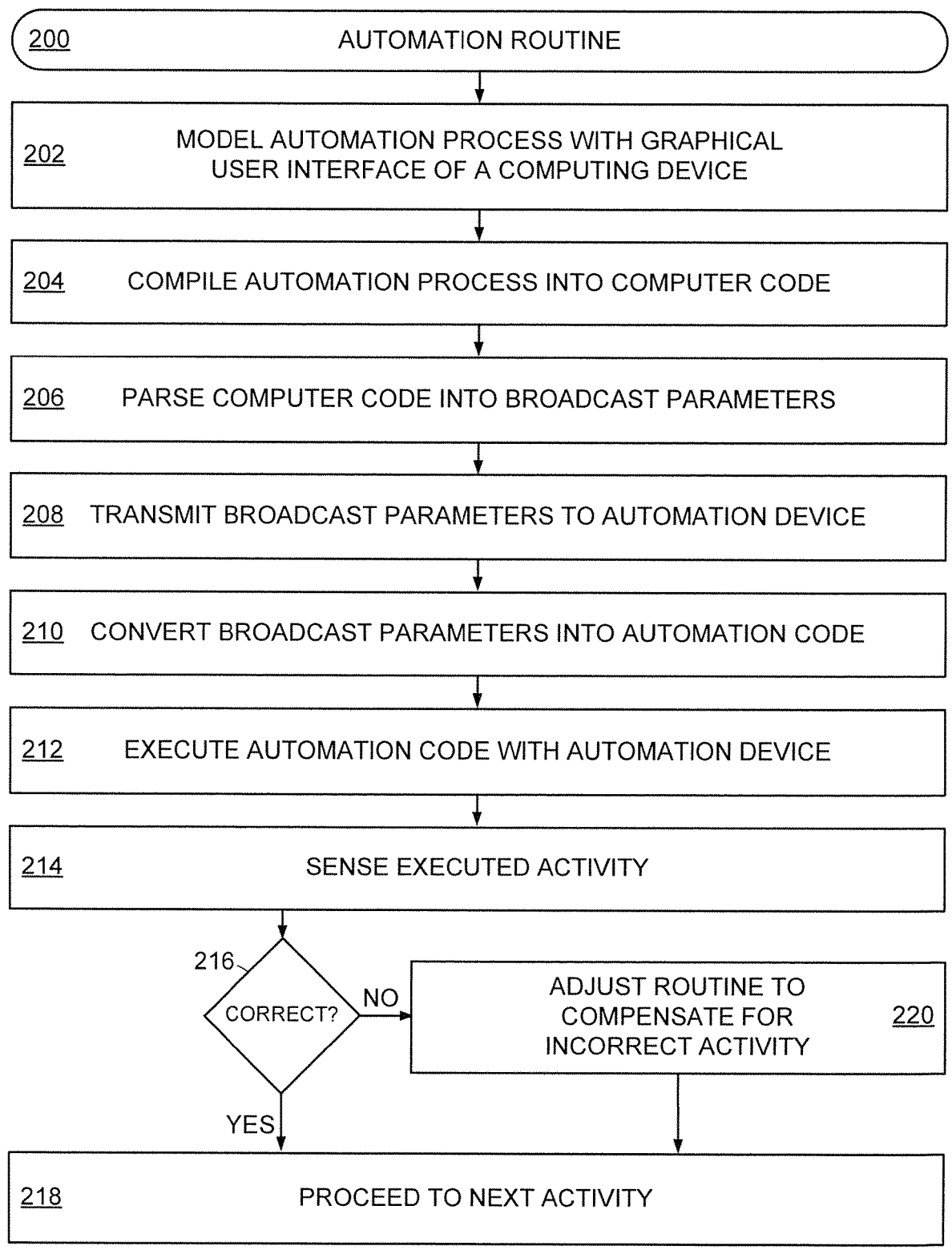
FIG. 6 conveys a flowchart of an example automation routine that can be carried out by the automation system of FIG. 1 in accordance with some embodiments.

FIG. 6 provides a flowchart of an example automation routine 200 that can be carried out by the automation system and components of FIGS. 1-5 in accordance with assorted embodiments. The routine 200 may begin by wirelessly, and or via a wired pathway, connecting at least one automated device to a computing device. In step 202 a user models an automation process with a GUI of the computing device. The modeling of step 202 may be code-based, visual-based, or a combination of the two. The modeled automation process is then compiled by a code module of the computing device in step 204 into a computer code, which can be characterized as synonymous with machine code.

The computer/machine code can be locally stored or referenced with a database to previous automation code, but such is not required. A parser module of the computing device proceeds to parse the computer code into broadcast parameters in step 206. The broadcast parameters may consist of any number and type of data that conforms to an open source communication protocol, such as OPC-UA. It is contemplated that the broadcast parameters are logically smaller and contain less data than the automation process as a whole, or the computer code compiled in step 204.

It is noted that the parsing of the computer/machine code into previously defined broadcast parameters conforming to open source communication protocol allows efficient transmission to one or more automation devices in step 208 and conversion into automation code in step 210 by each automation device. If the parser module did not intelligently condense the computer code into broadcast parameters, the transmission and conversion to automation code would be sub-optimal and may hamper the development and testing of the automation process modeled in step 202. The automation code may be different than the computer code, such as by being a different type of machine code, but the result of execution of either the computer code, in its entirety by a computer, or the automation code by the automated device in step 212 will be the same.

In some embodiments, the execution of the automation code to perform the modeled automation process cycles routine 200 back to step 202 while other embodiments proceeds to sense the executed automation process activity in step 214 either during or after step 212. Step 214 may activate one or more different types of sensors to determine if the automation process has been, or is being, executed correctly, which is evaluated in decision 216. If the sensed execution is correct, step 218 triggers the next activity to be performed, such as a subsequent event, motion, or series of actions called for by the automation process. That is, an automation process may be broken up into phases or activities that can be executed and sensed as correct in decision 216 prior to proceeding.

What is claimed is:

1. A method comprising:
    inputting an automation model into a computing device via a graphical user interface of the computing device;
    converting the automation model to computer code with a controller of the computing device, the computer code executable by an automation device;
    removing portions of the computer code with a parser module of the computing device to create broadcast parameters, the broadcast parameters translated from the computer code into a package conforming to a communication protocol and being incapable of being executed as the automation model by the automation device;
    transmitting the broadcast parameters to an automation device, the broadcast parameters being an open source communication protocol;
    translating the packaged broadcast parameters into an automation process with a de-parser module of the automation device; and
    executing the automation process with the automation device to physically enact the automation model with the automation device.

2. The method of claim 1, wherein the controller converts input from a user to the graphical user interface to the automation model.

3. The method of claim 2, wherein converts the user input to the automation model by accessing a database of automation operations stored in the computing device.

4. The method of claim 1, wherein the computing device and automation device are physically separate.

5. The method of claim 1, wherein the automation model is executed by the automation device without direct physical manipulation by the user.

6. The method of claim 1, wherein the computing device is connected to a plurality of remote hosts via a network.

7. The method of claim 1, wherein the automation device detects execution of the automation process with a sensor positioned on the automation device.

8. The method of claim 7, wherein the automation device confirms execution of the automation model with the sensor.

9. The method of claim 7, wherein the automation device deviates from the automation process to compensate for automation deviation operational variation.

10. A method comprising:
    modeling an automation process with a graphical user interface of a computing device;
    compiling the automation process into a computer code via a controller of the computing device;

parsing the computer code into broadcast parameters, the broadcast parameters having a smaller logical size than the computer code and being incapable of being executed as the automation model by an automation device;

transmitting the broadcast parameters to an automation device;

converting the broadcast parameters into the computer code via a controller of the automation device; and executing the automation code with the automation device resulting in the automation process being carried out.

11. The method of claim 10, wherein the broadcast parameters are transmitted via an open source machine protocol.

12. The method of claim 11, wherein the open source machine protocol is open platform communications-unified architecture (OPC-UA).

13. The method of claim 10, wherein the computer code is stored in a non-volatile memory of the computing device.

14. The method of claim 10, wherein the automation code is different than the computer code.

15. The method of claim 10, wherein the computer code consists of the automation process and other machine code.

16. The method of claim 10, wherein the automation process involves movement of a plurality of different components of the automation device.

17. The method of claim 10, wherein the computer code has an XML format.

18. An apparatus comprising a computing device having a graphical user interface and a controller, the controller configured to convert an automation model inputted to the graphical user interface by a user into computer code, a parser module of the computing device configured to remove portions of the computer code to translate the computer code into a package of broadcast parameters that conform to a communication protocol and are incapable of being executed as the automation model by the automation device until being transmitted to an automation device via a communication module of the computing device, the automation device comprising a de-parser module configured to translate the packaged broadcast parameters into an automation process, a controller of the automation device configured to execute the automation process to physically enact the automation model.

19. The apparatus of claim 18, wherein the graphical user interface is a touchscreen.

20. The apparatus of claim 18, wherein the automation device is positioned down-hole and the computing device is positioned above ground.

* * * * *